Inventor
Assar Svensson
Bertil Brandt
by Sommers+Young
Attorneys

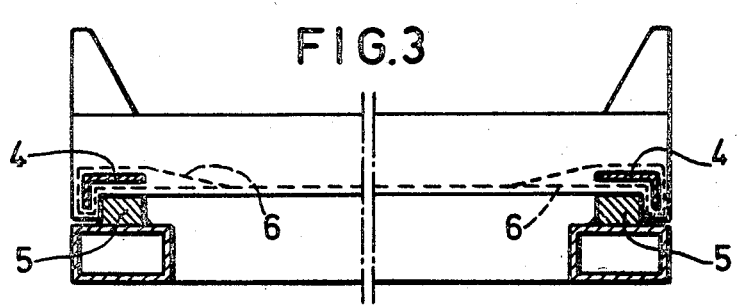
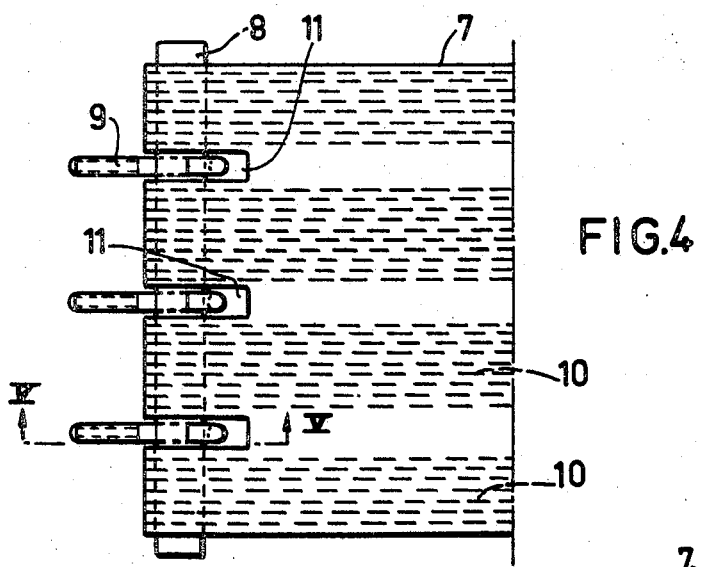
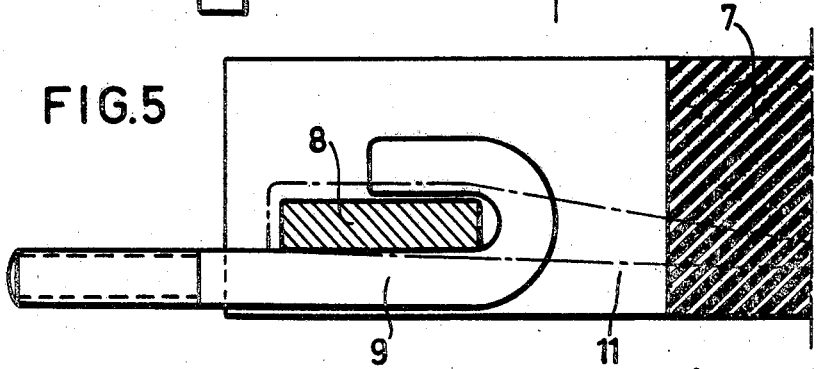

United States Patent Office 3,480,321
Patented Nov. 25, 1969

3,480,321
LINING PLATE FOR LOADING CAGE OR SIMILAR DEVICE
Bertil Brandt, Skelleftea, and Assar Svensson, Ersmark, Sweden, assignors to Skelleftea Gummifabriks A.B., Ersmark, Sweden, a joint-stock company of Sweden
Filed Nov. 3, 1967, Ser. No. 680,555
Claims priority, application Sweden, Nov. 10, 1966, 15,393/66
Int. Cl. B61d 11/02; B62d 33/02
U.S. Cl. 296—28                                              4 Claims

ABSTRACT OF THE DISCLOSURE

A lining plate of wear resistant rubber for a loading cage receiving heavy boulders that fall from a relatively great height. At least two of the opposite sides of the plate are provided with fastening means for the plate. The fastening means simultaneously serve as an anchoring for an elastic reinforcement arranged in the plate. The plate is mounted freely hanging above the basic structure of the loading cage at a distance from the bottom of the cage which corresponds to more than the maximum deflection caused by the greatest load encountered.

---

Figure 1:
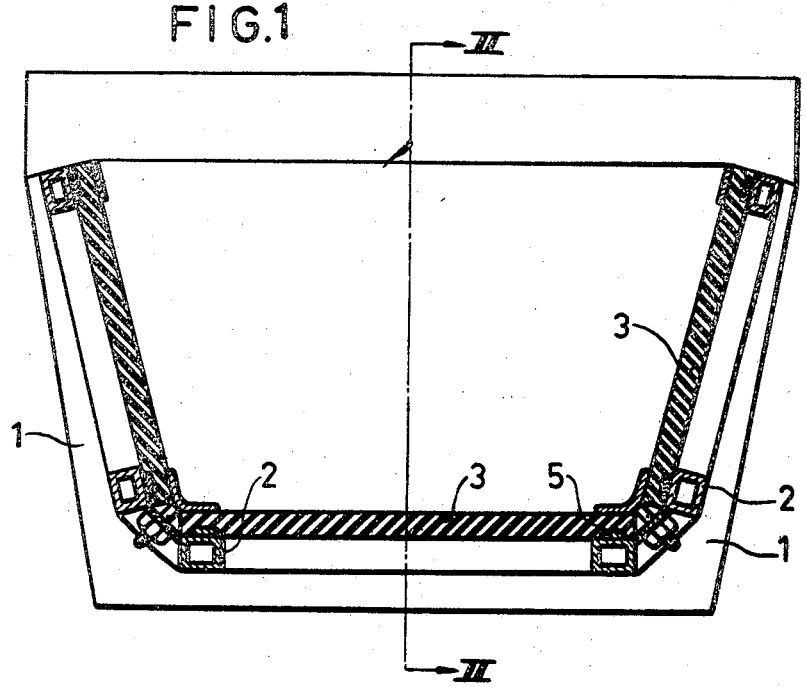

In present-day mining one often gets blocks or so-called boulders which may weigh up to five tons. The loading and transportation of these boulders to the ordinary crusher or Blake's crusher imply considerable demands as to the loading and transportation devices, particularly since the boulders are often allowed to fall freely for up to about 5 metres in the course of the loading; they have an energy content of up to 25 ton metres when they fall down on the loading device.

Loading cages for such purposes have previously been lined either with thick rubber plates or with steel sheets; in the latter case often with a layer of wood between the basic structure of the loading cage and the interchangeable steel-sheet lining.

For a long time rubber has been used for damping the relatively small momenta produced by comparatively fine-grained material. Coarser material needs thick plates if these are not to be pierced by the material when it is charged into the loading cage. For an individual weight of more than about one ton and a fall of 3 metres (3 ton metres) the elasticity of the rubber plates has generally been insufficient for withstanding the momentum which has resulted in the deformation of the basic structure of the loading cage. In addition, the thick plates have had the drawback that they take up a large volume and thus appropriate the space needed for useful load. The costs of the rubber have been rather high.

Steel-sheet linings get practically deformed at high stresses from coarse-grained material and get relatively rapidly worn. Deformation and wear increase markedly as the momentum increases.

Thus, the problem of the lining of loading devices for coarse material has not previously been solved in a satisfactory way. The present invention relates to a fully satisfactory solution of the problem as to how to protect the loading devices from the enormous stresses involved in the loading of heavy boulders.

The present invention relates to a lining plate, preferably of long-life rubber for a loading cage or similar device. The invention is mainly characterized in that at least two of the opposite sides of the plate are provided with fastening devices for the plate, the devices serving simultaneously as an anchoring means for an elastic reinforcement arranged on the plate, that the plate is arranged hanging freely above the basic structure of the loading cage at a distance from the latter which corresponds to more than the maximum deflection caused by the greatest load encountered.

The expression "loading cage or similar device" refers both to stationary and moveable loading devices receiving heavy boulders that fall from a relatively great height.

According to a preferred embodiment of the present invention the fastening devices of the plate are arranged so that they can be anchored in heads or hooks or longitudinal profiles arranged in the basic structure of the loading cage. The lining plates are best suited for the protection of so-called shell structures, the plate being fastened in a cantilever position in longitudinal beams or similar devices arranged in the shell structure. The free-hanging height of the plate above the frame structure is then determined by the height of the beams which, according to the present invention, shall exceed the deflection caused by the greatest load encountered.

Figure 2:
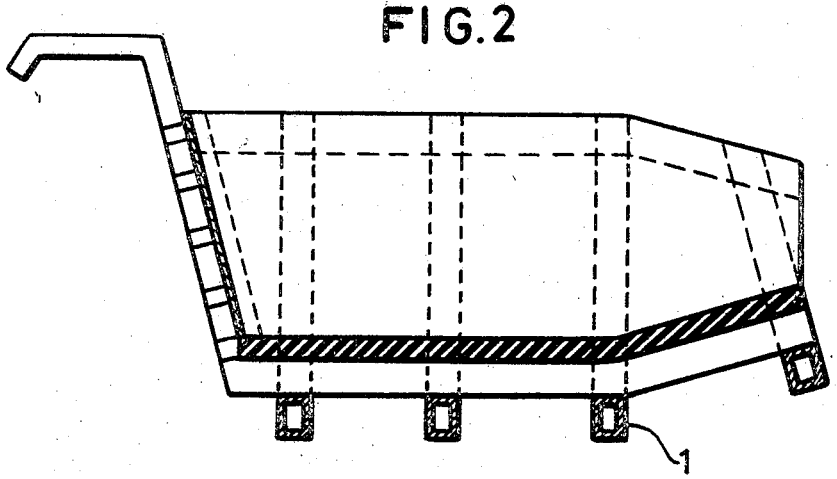

The present invention will further be described in the following with reference to the attached drawing where
FIG. 1 shows a cross section of an embodiment of the invention;
FIG. 2 schematically shows a longitudinal section along line II—II in FIG. 1;
FIG. 3 is a sectional view of the fastening devices, according to the invention;
FIG. 4 shows another embodiment of part of a plate according to the invention, seen from above; and
FIG. 5 shows a cross section along line V—V in FIG. 4.

The embodiment according to FIGS. 1 to 3 relates to to a loading cage on a so-called dumper car. The basic structure of the loading cage consists of clamps 1, inside of which longitudinal beams 2 are arranged. Lining plates 3 are anchored in beams 2 by means of fastening device 4 and longitudinal profiles 5, the latter firmly arranged at beams 2. The fastening devices, which in this case are hook-shaped (L-shaped) simultaneously form the anchoring for cord reinforcement 6, which runs from fastening device 4 along the lower part of the plate to the corresponding fastening devices at the opposite edge of the plate. The reinforcement should preferably be arranged below the centre line of the plate in order to be in a position to withstand the tensile stresses arising in the plate when it is loaded as satisfactorily as possible.

The embodiment, according to FIGS. 4 and 5, shows the fastening of lining plate 7, fastening devices 8 consisting of a steel bar which grips loop bolts 9 clamped to the frame structure. In this case the elastic reinforcement is placed in fields 10 between the loop bolts. At especially high stresses it may also be necessary to provide the plate with elastic cross-reinforcement placed in one of several directions differing from the direction of fields 10. Holes 11 in the plate are made in order to provide space for the loop bolts.

For the elastic reinforcement rayon or nylon cord, steel cord of glass fibres may serve as examples of suitable material. The reinforcement itself may also act as the fastening device since it has a bead at the ends or is firmly rolled; the bead or the roll may then be used as a fastening device which may grip suitably formed devices in the basic structure of the loading cage.

What we claim is:
1. A loading cage for supporting heavy boulders or the like in such a manner as to avoid damage to the loading cage even under heavy impact loads, the combination comprising:
   an outer structure for said cage,
   at least one lining plate formed of a wear-resistant elastic material and including means on at least two of its opposite sides for anchoring said lining plate to said outer structure,
   said anchoring means supporting said lining plate in a freely hanging position above said outer structure with a spacing therebetween which at least equals the maximum deflection of said lining plate caused by the greatest impact load expected to be encountered.

2. The combination of claim 1 in which said anchoring means comprises a longitudinal plate secured to said outer structure and elastic members in said lining plate secured to said longitudinal plate.

3. The combination of claim 1 in which said anchoring means comprises a longitudinal bar and hook members whose shank portion is secured to said outer cage structure and whose hook portion engages with said longitudinal bar, said lining plate including a plurality of elastic members secured to said bar.

4. The combination of claim 1 in which said anchoring means comprises longitudinal profiled members secured to said outer cage structure and elastic members engaging said longitudinal profile members.

References Cited

UNITED STATES PATENTS

| | | | |
|---|---|---|---|
| 2,311,501 | 2/1943 | Zoldok | 105—422 X |
| 3,006,396 | 10/1961 | Cushman | 150—48 X |

FOREIGN PATENTS

| | | |
|---|---|---|
| 1,044,063 | 6/1953 | France. |
| 580,033 | 8/1946 | Great Britain. |
| 746,737 | 3/1956 | Great Britain. |

LEO FRIAGLIA, Primary Examiner

J. A. PEKAR, Assistant Examiner

U.S. Cl. X.R.

105—364, 422, 423; 296—39; 298—1